United States Patent [19]

Shimizu et al.

[11] Patent Number: 4,539,230

[45] Date of Patent: Sep. 3, 1985

[54] METHOD FOR PREVENTING DEPOSITION OF POLYMER SCALE AND A COATING AGENT THEREFOR

[75] Inventors: Toshihide Shimizu, Chiba; Ichiro Kaneko; Yoshiteru Shimakura, both of Ibaraki, all of Japan

[73] Assignee: Shin-Etsu Chemical Co., Ltd., Tokyo, Japan

[21] Appl. No.: 601,052

[22] Filed: Apr. 16, 1984

[30] Foreign Application Priority Data

Apr. 28, 1983 [JP] Japan ............... 58-75557

[51] Int. Cl.³ .................. B05D 7/22; C08F 2/00
[52] U.S. Cl. .................. 427/230; 427/239; 427/384; 526/62; 252/181
[58] Field of Search ........... 427/230, 236, 239, 384, 427/397.7; 526/62; 252/181, 85; 422/131

[56] References Cited

U.S. PATENT DOCUMENTS 4,145,496  3/1979  Weimer et al. ............... 526/62
4,320,215  3/1982  Yonezawa et al. ............ 526/62

FOREIGN PATENT DOCUMENTS 185301  11/1982  Japan ............... 526/62

*Primary Examiner*—Norman Morgenstern
*Assistant Examiner*—Ken Jaconetty
*Attorney, Agent, or Firm*—Toren, McGeady, Stanger, Goldberg & Kiel

[57] ABSTRACT

The invention provides a method for preventing deposition of polymer scale on the reactor walls in the polymerization of an ethylenically unsaturated monomer, in particular, by emulsion polymerization. The method comprises coating the reactor walls with a coating composition containing, as the essential components, (A) an organic compound having at least 5 conjugated $\pi$ bonds in a molecule, (B) a chelating agent and (C) a metal compound capable of producing metal ions having a coordination number of at least 2 which presumably forms a metallic chelate compound with the chelating agent contributing to the formation of a strongly adsorbed layer on the reactor walls. The coating composition may be further admixed with a silicic acid compound such as a colloidal silica.

7 Claims, No Drawings

METHOD FOR PREVENTING DEPOSITION OF POLYMER SCALE AND A COATING AGENT THEREFOR

BACKGROUND OF THE INVENTION

The present invention relates to a method for preventing deposition of polymer scale on the inner walls of a polymerization reactor in the polymerization of an ethylenically unsaturated monomer by providing a coating on the walls and a coating agent used therefor.

As is well known, polymers of ethylenically unsaturated monomers or, in particular, vinylic monomers are produced in a variety of polymerization processes including suspension polymerization, emulsion polymerization, solution polymerization, gas-phase polymerization and bulk polymerization. One of the most serious problems common in all of these polymerization processes is the deposition of polymer scale on the reactor walls and other surfaces coming into contact with the monomer during polymerization such as the stirrer blades and the like. When polymer scale is deposited on the reactor walls and other surfaces, several disadvantages are caused thereby such as the decrease in the yield of the polymer product so much, decrease in the cooling capacity of the reactor adversely affecting the productivity and possible degradation of the product quality due to the eventual falling off and intermixing of the polymer scale in the polymer product. In addition, the reactor walls covered with the polymer scale deposited thereon must be thoroughly cleaned before preparing for the next run of the polymerization with consumption of a great deal of time and labor while such works for polymer scale removal involve a very serious problem in the workers' health due to the toxicity of the unreacted monomer contained in the polymer scale as is a matter of public concern in recent years.

A variety of methods have of course been proposed to prevent deposition of polymer scale on to the reactor walls including, for example, a method in which the reactor walls are coated prior to polymerization with a polar organic compound, e.g. amine compounds, quinone compounds, aldehyde compounds and the like, or dyes or pigments (see, for example, Japanese Patent Publications 45-30343 and 45-30835) and a method in which the coating composition is prepared by treating a polar organic compound or a dye with a metal salt (see, for example, Japanese Patent Publication 52-24953).

These prior art methods are indeed effective in the suspension polymerization of vinylic monomers for preventing polymer scale deposition on the reactor walls but the effectiveness of these methods is greatly reduced or almost no effect can be obtained with these methods for scale prevention in the emulsion polymerization of vinylic monomers. In particular, the effectiveness of these prior art methods is dependent on the types of the monomers and, if not ineffective at all, little effect can be obtained for polymer scale prevention when the polymerization mixture contains one or more of water-soluble monomers such as acrylic, methacrylic and itaconic acids.

SUMMARY OF THE INVENTION

It is therefore an object of the present invention to provide a novel and improved method for preventing polymer scale deposition in the polymerization of an ethylenically unsaturated monomer regardless of the type of the polymerization process including suspension polymerization, emulsion plolymerization and others.

Another object of the present invention is to provide a method for preventing polymer scale deposition on the reactor walls even when the polymerization is undertaken in a polymerization mixture containing one or more of water-soluble monomers by providing a coating layer on the reactor walls prior to the polymerization.

The coating composition of the invention to be applied to the reactor walls comprises (A) an organic compound having at least 5 conjugated $\pi$ bonds in a molecule, (B) a chelating agent and (C) a metal compound capable of producing metal ions having a coordination number of at least 2. The coating composition may further be admixed with a silicic acid compound so that the effectiveness of the method by use of the coating composition is further enhanced.

Thus the method of the invention comprises coating the reactor walls with the coating composition as described above in a suitable solvent followed by drying.

In the above described formulation of the coating composition, the chelating agent and the metal compound readily react to form a metallic chelate compound so that the coating composition may be prepared by first reacting the chelating agent and the metal compound to form a metallic chelate compound which is then admixed with the organic compound as the component (A) in a suitable solvent.

DETAILED DESCRIPTION OF THE PREFERRED EMBODIMENTS

The above described method of the present invention is very effective in preventing polymer scale deposition on the reactor walls and other surfaces coming into contact with the monomer during polymerization regardless of the type of the polymerization process including suspension polymerization, emulsion polymerization and others. Further, the method is effective regardless of the material of which the reactor walls are formed including, for example, stainless steel, carbon steel, nickel, Monel metal and titanium. The method is of course effective in the polymerization using a glass-lined polymerization reactor. The effectiveness of the inventive method is free from influences by the kind of the monomer subjected to the polymerization, formulation of the polymerization mixture, type of the polymerization initiator and other factors.

The mechanism by which the inventive method exhibits the above mentioned remarkable effectiveness in the polymer scale prevention is not well understood but it is presumable that the combined use of the organic compound having at least 5 conjugated $\pi$ bonds in a molecule and the metallic chelate compound may serve to form a strongly adsorbed layer on the reactor walls which is effective in preventing specific adsorption of any dissociated and undissociated species in the polymerization mixture which otherwise may result in the build-up of polymer scale on the reactor walls.

The component (A) in the coating composition used in the inventive method is preferably a cationic organic compound having at least 5 conjugated $\pi$ bonds or nitrogen-containing conjugated $\pi$ bonds in a molecule free from sulfonic acid group, carboxylic acid group and hydroxyl group or an anionic organic compound having at least one sulfonic acid group, carboxylic acid group or hydroxyl group and at least 5 conjugated $\pi$ bonds in a molecule. The organic compounds suitable as the component (A) belong to several classes such as naphthalene compounds, aromatic polycyclic compounds, aromatic amine compounds, aromatic aldehyde compounds, aromatic ketone compounds, azo and diazo compounds, aromatic unsaturated compounds, polyphenyl compounds, diphenylmethane compounds, quinone compounds, benzene derivatives, non-benzene aromatic cyclic compounds, oxygen-containing heterocyclic compounds, nitrogen-containing heterocyclic compounds, sulfur-containing heterocyclic compounds, aliphatic compounds, carotinoid compounds, alkaloid compounds, alicyclic compounds and the like.

Exemplary of particular compounds suitable as the component (A) are naphthalene, dinaphthopyridazine, benzoquinoline, naphthylamine, dibenzophenazine, methylbenzoindole, dibenzoacridine, perylene, benzophenothiazine, N-phenyl naphthylamine, C.I. Solvent Blue 2, dibenzocarbazole, diaminobinaphthyl, dibenzoanthracene, phenyl benzofluorene, hydroxynaphthacenequinone, naphthalene indole indigo, C.I. Solvent Green 3, naphthyl disulfide, benzindoxazene, bis(-methoxynaphthyl)butadiene, anthracene, phenylanthracene, naphthylanthracene, bianthryl, anthrone, phenanthrene, phenanthrenequinone, pentacene, hexacene, benzophenanthrene, benzoanthracene, naphthopyrene, dibenzoanthracene, dibenzophenanthrene, hexabenzobenzene, C.I. Basic Red 2, C.I. Solvent Black 5, C.I. Pigment Black 1, C.I. Disperse Blue 56, C.I. Basic Violet 1, phenanthrophenazine, diaminophenazine, C.I. Basic Red 1, C.I. Basic Blue 9, diaminoacridine, C.I. Basic Yellow 16, tetramino-phenazine, phenyl benzyl benzimidazol, C.I. Basic Green 4, benzoflavin, phenyl benzthiazole, chalcone phenyl hydrazone, triphenyl pyrazoline, phenyl azotriphenyl pyrazol, C.I. Basic Orange 14, azobenzene, phenoxazoxide, diphenyl polyene, α-cinnamylidene acetylacetone, terphenyl, linear quaterphenyl, C.I. Basic Violet 3, bibenzoquinone, indoaniline, naphthoquinone, naphthoquinone phenylimide, binaphthyl diquinone, methyl naphthotriazolequinone, naphthopyrazolquinone, dinaphthofuranquinone, bis(naphthoquinonyl)benzidine, anthraquinone, dianthraquinonyl ethylene, dianthraquinoneimide, aminoanthraquinone, C.I. Disperse Red 91, C.I. Disperse Blue 56, C.I. Disperse Violet 8, o-diazine, phthaloyl benzanthrone, anthraquinone acridone, pyranthrone, flavanthrone, alizarinquinone, violanthrone, C.I. Vat Yellow 4, C.I. Vat Yellow 10, C.I. Vat Yellow 2, C.I. Vat Orange 2, C.I. Vat Yellow 20, C.I. Vat Yellow 33, C.I. Vat Orange 4, C.I. Vat Red 13, C.I. Vat Red 10, C.I. Vat Brown 25, C.I. Vat Blue 66, C.I. Vat Yellow 22, C.I. Vat Yellow 21, C.I. Vat Yellow 9, C.I. Vat Yellow 20, C.I. Vat Blue 67, C.I. Vat Green 3, anthraquinone carbazole, C.I. Vat Brown 61, C.I. Vat Orange 2, C.I. Vat Brown 72, C.I. Vat Yellow 22, C.I. Vat Green 8, C.I. Vat Green 1, C.I. Vat Orange 1, C.I. Vat Black 29, C.I. Vat Orange 3, C.I. Vat Blue 72, C.I. Vat Black 36, C.I. Vat Black 8, C.I. Vat Brown 68, phenyl cycloheptatrienone, benzotropone, naphthotropone, dibenzotropone, tribenzotropone, mercaptodiazaazulene, benzotropazine, aminoazulene, azulene, thienoazulene, pyrroloazulene, quinoxalotropone, benzotropothiazine, cyclooctadecanonaene, furanoflavon, hydroxyindigo, benzylidene coumaranone, dibenzofuran, bidibenzofuryl, diflavylene oxide, pelargonidin, cyanidine, delphinidine, peonidine, malvidin, hirsutidin, chromone, flavone, dixanthylene, dipyrrylmethane, indolocarbazole, diindolyl, roseindole, isatin blue, indigo, indigoazine, anil red, indirubin, carbazole, benzindole, benzocarbazole, indoloindole, indolocarbazole, dibenzocarbazole, naphthocarbazole, tetraphenyl furoindole, thienocarbazole, indolothiachromene, porphyrazine, C.I. Pigment Blue 15, diazacoproporphyrin, mesotetraphenyl porphyrin, azopyridine, quinoline, benzoquinoline, thienylquinoline, flavaniline, C.I. Disperse Red 9, C.I. Solvent Blue 12, pinacyanol, xenocyanine, neocyanine, azacyanine, biquinoline, pyrroloquinoline, aminothiazoloquinoline, triazoloquinaldine, imidazoquinoline, pyrimidoquinoline, benzoquinoline, acridine, acridanone, C.I. Basic Orange 14, benzoflavin, C.I. Basic Orange 15, crysaniline, parafuchsin, C.I. Basic Red 27, proflavin, acriflavin, acrinamine, phenanthridine, amino-(4-aminophenyl)methyl phenanthridium chloride, diaminophenyl methyl phenanthridium bromide, anthrazoline, diphenyl pyridoquinoline, phenanthroline, pyridoindole, methylene dihydroxy indoline, naphthylidine, C.I. Basic Blue 12, C.I. Ba-sic Blue 6, C.I. Basic Blue 3, C.I. Basic Blue 60, phthalazine, vitamin $B_2$, phenazine, diaminophenazine, α-quaterthienyl, diiminothioindigo, dibenzothiophene, thiophanthrene, benzothiophanthraquinone, thianthrene, dimethyl polyene, conjugated polyacetylene, quinoxazoline, β-carotene, β-apocartinal, α-carotene, γ-carotene, lycopene, renieratene, rubixanthin, rhodoxanthin, astacene, aphanin, rhodoviolascin, diazine, indene spirocyclobutanedione indene, methylpyrene, naphtharizarin, C.I. Acid Red 131, aminonaphthol sulfonic acid, hydroxynaphthacenequinone, hydroxymethyl benzocarbazole, dihydroxy naphthofluoran, hydroxybenzoacridine, hydroxy dimethylaminonaphthophenoxazine, tetrahydroxy naphthalene, dithiodinaphthol, mercaptonaphthol, bis(hydroxynaphthyl)ethylene, naphthoic acid, dihydroxy binaphthyl dicarboxylic acid, benzocarbazole carboxylic acid, phenyl dibenzoxanthene dicarboxylic acid, hydroxy benzanthrone, hydroxy benzofluorenone, dihydroxy anthracene, anthracene carboxylic acid, hydroxyphenanthrene carboamino pentahydroxy methyl naphthacene, benzophenanthrene carboxylic acid, perylene tetracarboxylic acid, dihydroxy triphenylene dioxide, hydroxy binaphthyldiquinone, trihydroxyphenyl dihydroxynaphthalene, dihydroxy naphthoquinone, aminoxy naphthoquinone, anthrahydroquinone, quinizarin, purpurin, C.I. Mordant Blue 51, C.I. Solubilized Vat Blue 6, C.I. Vat Blue 72, C.I. Acid Violet 34, C.I. Mordant Blue 56, C.I. Mordant Blue 10, C.I. Mordant Blue 44, C.I. Mordant Blue 51, C.I. Acid Blue 129, C.I. Acid Green 41, C.I. Acid Black 48, C.I. Mordant Red 3, C.I. Vat Violet 9, allyl aminoanthraquinone carboxylic acid, C.I. Solubilized Vat Blue 26, C.I. Vat Blue 67, C.I. Vat Blue 64, C.I. Acid Blue 40, C.I. Direct Green 28, gallein, dihydroxyacridone, dihydroxy quinoxaline, C.I. Acid Orange 7, hydroxyphenoxazone, carbostyril, hydroxyquinacridine, hydroxyphenyl quinoline, aurin, atromentin, aminophenoxazone carboxylic acid, C.I. Azoic Black 1, C.I. Mordant Black 84, C.I. Solvent Black 7, C.I. Direct Red 2, C.I. Direct Black 38. C.I. Acid Yellow 12, C.I. Acid Yellow 23, sodium dinitrostilbene disulfonate, dihydroxystilbene, C.I. Fluorescent Brightening Agent 32, C.I. Fluorescent Brightening Agent 30, stilbestrol, terphenyl carboxylic acid, ditroponyl, quinoxatripone oxime, desacetoamidoanhydrocolchiceine, indolotropolone, vitamin A, cryptoxanthin, zeaxanthin, lutein, capsanthin, bixin, crocetin, azafrin, gazaniaxanthin, torularhodin, fucoxanthin, skimmianic acid, morphol, thebenol, harmalol, norharman carboxylic acid, polyene dicarboxylic acid, polyacetylene dicarboxylic acid, C.I. Direct Yellow 33, egonol, quercetin, acacetin, fukugetin, fisetin, robinetin, irigenin, osajin, hydroxyflavanone, carthamidine, alpinon, flavonol, gentisin, fluorescein, thiofluorescein, C.I. Direct Yellow 50, naphthothiazole carboxylic acid, tartrazine, quinolinol, thalleiquin, quinaldinic acid, quinoline carboxylic acid, acridinic acid, acridine carboxylic acid, pyridoquinoline diol, diphenyl pyridoquinoline dicarboxylic acid, carboline carboxylic acid, naphthylidine, hydroxynaphthylidine dicarboxylic acid, resazurin, gallocyanine, xanthommatin, aminocinnoline, isoquanine, isoxanthopterin, folic acid, pteroic acid and quinoxaline carboxylic acid.

The component (B) is a chelating agent and preferable chelating agents include cationic chelating agents, i.e. compounds having no acidic chelating coordination groups and having a coordination group such as $-NH_2$ group as in primary amines, amides and hydrazine compounds, $=NH$ groups as in secondary amine and hydrazine compounds, $-N$ groups as in tertiary amines, $-N=N-$ groups as in azo compounds and heterocyclic compounds, $-NO_2$ groups as in nitro compounds, $-N=O$ groups as in nitroso compounds, $=C=N$ groups as in Schiff bases and heterocyclic compounds, $=C=NH$ groups as in aldehyde and ketone imine compounds and enamines, $-S-$ groups as in thioether compounds, $=C=S$ groups as in thioketone compounds and thioamide compounds, $=S$ groups as in heterocyclic compounds, $-SCN$ groups as in thiocyanate compounds and isothiocyanate compounds, $=C=O$ groups as in aldehyde, ketone and quinone compounds, $-O-$ groups as in ether compounds, $-COOR$ groups as in ester compounds, $-N \rightarrow O$ groups as in N— oxide compounds and the like and anionic chelating agents having an acidic chelating coordination group such as $-OH$ groups as in alcohols, $-COOH$ groups as in carboxylic acid compounds, $-SO_3H$ groups as in sulfonic acid compounds, $=N-OH$ groups as in oxime compounds, $-SH$ groups as in thiol compounds, $-CO-SH$, $-CS-OH$ and $-CS-SH$ groups as in thiocarboxylic acid compounds and the like.

Exemplary of particularly preferable chelating agents as the component (B) are ethylenediamine, diethylenetriamine, triethylenetetramine, triaminotriethylamine, tetrakis(2-aminoethyl)ethylenediamine, N,N'-dimethyl ethylenediamine, N,N'-tetramethyl ethylenediamine, 1,3-diaminopropane, 1,2-diaminopropane, pyridine, bipyridine, terpyridine, o-phenanthroline, thiourea, glyoxal bis(methylimine), acetylacetone, thenoyl trifluoroacetone, purine, piperidine, histamin, imidazol, 2,2'-diquinolyl, 4,7-diphenyl-1,10-phenanthroline, 1,2-phenylenediamine, 3,3'-diaminobenzidine, diphenyl carbazide, diphenyl carbazone, benzoylmethane, dithizone, diphenyl thiocarbodiazone, isonicotinic acid hydrazide, N-dihydroxy ethylglycine, iminodiacetic acid, nitrilotriacetic acid, N-hydroxy ethylimino diacetic acid, ethylenediamine tetraacetic acid, N,N'-ethylenediamine diacetic acid, N-hydroxyethyl ethylenediamine triacetic acid, diethylenetriamine pentaacetic acid, 1,2-cyclohexanediamine tetraacetic acid, trimethylenediamine tetraacetic acid, ethylene bis(2-aminoethyl ether)-N,N,N',N'-tetraacetic acid, ethylenediamine tetrapropionic acid, ethylenediamine dipropionic diacetic acid, 2-aminoethyl phosphonic-N,N-diacetic acid, aminomethylphosphonic-N,N'-diacetic acid, citric acid, tartaric acid, ascorbic acid, thioglycolic acid, 2,3-dimercaptopropyl alcohol, sodium diethyl dithiocarbamate, 8-hydroxyquinoline, dimethylglyoxime, glycine, aspartic acid, N,N'-di(hydroxyethyl)ethylenediamine, triethanolamine, α-furyldioxime, 1,2-dimercaptopropyl alcohol, α-benzoinoxime, quinaldinic acid, thiooxine, 2-mercaptobenzothiazole and adenosine-5'-triphosphate.

The component (C) is a metal compound capable of producing metal ions having a coordination number of at least 2. Such metal ions include those having a coordination number of 2 exemplified by Cu(I), Ag(I), Hg(I) and Hg(II); those having a coordination number of 4 exemplified by Li(I), Be(II), B(III), Zn(II), Cd(II), Hg(II), Al(III), Co(II), Ni(II), Cu(II), Ag(II), Au(II), Au(III), Pd(II) and Pt(II); those having a coordination number of 6 exemplified by Ca(II), Sr(II), Ba(II), Ti(IV), V(III), V(IV), Cr(III), Mn(II), Mn(III), Fe(II), Fe(III), Co(II), Co(III), Ni(II), Pd(IV), Pt(IV), Cd(II), Al(III), Sc(III), Y(III), Si(IV), Sn(II), Sn(IV), Pb(II), Pb(IV), Ru(III), Rh(III), Os(III), Ir(III) and lanthanide ions; and those having a coordination number of 8 exemplified by Zr(IV), Hf(IV), Mo(IV), W(IV), U(IV) and actinide ions. The form of the metal compound is not limitative provided that the metallic ions in the compound can form a metallic chelate compound with the chelating agent as the component (B) including halides, nitrates, sulfates, hydroxides and oxides as well as salts with organic acids such as oxalic acid, acetic acid and the like.

While the essential ingredients in the coating composition used in the inventive method are (A) an organic compound having at least 5 conjugated $\pi$ bonds in a molecule, (B) a chelating agent and (C) a metal compound, it is preferable that the combination of the components (A) and (B) should be selected such that one of them is cationic and the other is anionic. In other words, the chelating agent should be anionic when the organic compound as the component (A) is cationic and the chelating agent should be cationic when the component (A) is anionic.

The coating composition used in the inventive method is prepared by dissolving or dispersing the components (A), (B) and (C) in a suitable solvent while it is optional that the components (B) and (C) are reacted together in advance to form a metallic chelate compound which is then combined with the organic compound as the component (A). The amount of the chelating agent as the component (B) should be in the range from 0.01 to 10 parts by weight per 1 part by weight of the organic compound as the component (A) and the amount of the metal compound as the component (C) should be sufficient to fully convert the chelating agent into a metallic chelate compound although an excess amount of the metal compound is undesirable due to the adverse influence on the scale preventing effect of the coating composition caused by the presence of unchelated metal ions.

The solvent in which the components (A), (B) and (C) are dissolved or dispersed is selected usually from alcoholic solvents, aliphatic hydrocarbon solvents, ketone solvents, ester solvents, ether solvents and water. These solvents may be used as a mixture of two kinds or more according to need.

As is mentioned before, the coating composition used in the inventive method may be further admixed with a silicic acid compound whereby the scale preventing effect can be further enhanced in some cases. Such a silicic acid compound is selected from colloidal silica, water-soluble silicic acids and silicate compounds exemplified by various kinds of commercially available colloidal silica, orthosilicic acid, metasilicic acid, mesodisilicic acid, mesotrisilicic acid, mesotetrasilicic acid, sodium metasilicate, potassium hydrogen disilicic acid, lithium orthosilicate, hexalithium orthodisilicate, water glass, 12-silicotungstic acid, meso-12-silicotungstic acid, 10-silicotungstic acid, potassium 12-silicotungstate, potassium iso-12-silicotungstate, potassium 10-silicontungstate, sodium 12-silicotungstate, silicomolybdic acid, potassium silicomolybdate, sodium silicomolybdate and the like.

When the coating composition is admixed with these silicic acid compounds, the compound is dissolved or dispersed in a small volume of water in advance which is then added to the coating composition although the silicic acid compound as such may be added to the coating composition depending on the solubility or dispersibility thereof. The amount of the silicic acid compound in the coating composition should be in the range from 0.01 to 10 parts by weight per 1 part by weight of the organic compound as the component (A).

The above described coating composition exhibits very remarkable effect for preventing polymer scale deposition on the inner walls and other parts of a polymerization reactor coated with the composition followed by drying. The coating composition used for the coating works should have a solid concentration of 0.01 to 5% by weight or, preferably, 0.05 to 1% by weight as a solution or dispersion. The coating amount on the surface should be at least 0.001 g/m$^2$ or, preferably, at least 0.01 g/m$^2$ as dried.

The coated surface wet with the coating composition should be dried, for example, by blowing with hot air. Alternatively, the surfaces to be coated are heated in advance at a temperature of 40° to 100° C., for example, by passing hot water or steam through the jacket of the reactor and the coating composition is applied to the thus heated surfaces so that the wet surfaces can rapidly be dried. After completion of drying, the coated surfaces are washed with water, if necessary, to wash away any soluble matters.

When the reactor walls and other surfaces have been coated with the coating composition followed by drying in the above described manner, the polymerization reactor is charged with the materials pertaining to the polymerization reaction such as water as the medium for the polymerization, a monomer or a mixture of monomers, polymerization initiator and other additives, e.g. suspending agent, emulsifier, dispersion aid and the like, according to the type of the intended polymerization process.

The method of the present invention is effective regardless of the types of the polymerization process including suspension polymerization and emulsion polymerization most widely practiced in the polymerization of vinylic monomers. The effectiveness of the inventive method is little affected by the presence of various auxiliary additives conventionally used in the suspension and emulsion polymerization processes including suspending agents such as partially saponified polyvinyl alcohols, methyl cellulose and other cellulose derivatives and the like, anionic emulsifying agents such as sodium laurylsulfate, sodium dodecylbenzene sulfonate, sodium dioctylsulfosuccinate and the like, nonionic emulsifying agents such as sorbitan monolaurate, polyoxyethylene alkyl ethers and the like, fillers such as calcium carbonate, titanium dioxide and the like, stabilizers such as tribasic lead sulfate, calcium stearate, dibutyltin dilaurate, dioctyltin mercaptide and the like, lubricants such as rice wax, stearic acid and the like, plasticizers such as dioctyl phthalate, dibutyl phthalate and the like, chain transfer agents such as trichloroethylene, mercaptans and the like, pH controlling agents, polymerization initiators such as diisopropylperoxy dicarbonate, α,α'-azobis-2,4-dimethylvaleronitrile, lauroyl peroxide, potassium persulfate, cumene hydroperoxide, p-menthane hydroperoxide and the like, and others.

The method of the present invention is applicable to the polymerization of various kinds of ethylenically unsaturated monomers exemplified by the vinylic monomers such as vinyl halides, e.g. vinyl chloride, vinyl esters, e.g. vinyl acetate and vinyl propionate, acrylic and methacrylic acids as well as esters thereof, maleic and fumaric acids as well as esters thereof and maleic anhydride, dienic monomers, e.g. butadiene, chloroprene and isoprene, styrene, acrylonitrile, vinylidene halides and vinyl ethers.

As is mentioned before, in particular, the method of the present invention is effective also for the polymerization systems in which one or more of water-soluble monomers are involved as exemplified by acrylic acid, methacrylic acid, itaconic acid, acrylamide, methacrylamide, dimethylaminoethyl methacrylate, N-methylol acrylamide, N-methylol methacrylamide, 2-hydroxyethyl methacrylate, 2-hydroxypropyl acrylate, acrolein and the like.

In the following, the method of the present invention is described in further detail by way of examples.

EXAMPLE 1

An emulsion copolymerization run of butadiene, styrene and acrylic acid was preceded by the coating treatment of the reactor walls with a coating composition prepared in the formulation described below.

Thus, an organic compound having at least 5 conjugated π bonds per molecule as the component (A), a chelating agent as the component (B) and a metal compound as the component (C) each indicated in Table 1 below were mixed together in the proportion shown in the same table and dissolved in a 80:20 by weight mixture of water and methyl alcohol in an amount to give an overall concentration of 0.5% by weight.

The walls and other surfaces of a stainless steel-made polymerization reactor of 100 liter capacity equipped with a stirrer were coated with the above prepared coating composition and dried by heating at 50° C. for 30 minutes followed by washing with water. Into the thus coated polymerization reactor were introduced 40 kg of deionized waer, 10 kg of 1,3-butadiene, 10 kg of styrene, 400 g of acrylic acid, 600 g of sodium laurylsulfate, 500 g of tert-dodecyl mercaptan and 100 g of potassium persulfate and the polymerization run was performed by agitating the polymerization mixture at 60° C. for 8 hours.

After completion of the polymerization run, the polymerizate slurry was discharged out of the polymerization reactor and the amount of the polymer scale deposited on the reactor walls was examined to give the results shown in Table 1. In this table and also in the tables to follow, the notations of (a) and (c) following the names of the compounds in the columns of the components (A) and (B) indicate that the compound of the preceding name is anionic or cationic, respectively.

EXAMPLE 2

Coating compositions were prepared each in an overall concentration of 1% by weight by dissolving the components (A), (B) and (C) indicated in Table 2 in a proportion shown in the table in a solvent also shown in the table.

The inner walls and other surfaces of a stainless steel-made polymerization reactor of 100 liter capacity equipped with a stirrer were coated with either one of the thus prepared coating compositions and dried by keeping at 40° C. for 30 minutes followed by washing with water. Into the thus coated polymerization reactor were introduced 40 kg of deionized water, 500 g of sodium oleate, 13 kg of a polybutadiene latex having a solid content of 45%, 9.0 kg of styrene monomer, 5.0 kg of acrylonitrile monomer, 40 g of tert-dodecyl mercaptan and 140 g of cumene hydroperoxide and the polymerization reaction was performed by agitating the polymerization mixture at 65° C. for 5 hours.

After completion of the polymerization run in the above described manner, the polymerizate slurry was discharged out of the polymerization reactor and another run of the polymerization reaction was performed in just the same manner without cleaning the reactor walls prior to the introduction of the polymerization mixture. By repeating the polymerization runs in this manner, the number of runs which could be performed without polymer scale deposition in an amount exceeding 1 g/m$^2$ was recorded to give the results shown in Table 2.

TABLE 1

| Exp. No. | A | B | C | A:B:C weight ratio | Scale deposition, g/m$^2$ |
|---|---|---|---|---|---|
| 1 | — | — | — | — | 1200 |
| 2 | C.I. Solvent Black 7 (a) | — | — | 100:0:0 | 1050 |
| 3 | — | o-Phenanthroline (c) | — | 0:100:0 | 900 |
| 4 | — | o-Phenanthroline (c) | FeCl$_2$ | 0:40:60 | 830 |
| 5 | C.I. Solvent Black 7 (a) | o-Phenanthroline (c) | — | 50:50:0 | 550 |
| 6 | C.I. Solvent Black 7 (a) | — | FeCl$_2$ | 80:0:20 | 600 |
| 7 | C.I. Solvent Black 7 (a) | o-Phenanthroline (c) | FeCl$_2$ | 60:25:15 | 0 |
| 8 | Hydroxybenzanthrone (a) | Isonicotinic hydrazide (c) | Zn(CH$_3$COO)$_2$ | 70:20:10 | 10 |
| 9 | C.I. Basic Red 2 (c) | 8-Hydroxyquinoline (a) | Ni(NO$_3$)$_2$ | 80:10:10 | 2 |
| 10 | C.I. Mordant Blue 51 (a) | Bipyridine (c) | Co(CH$_3$COO)$_2$ | 70:22:8 | 0 |
| 11 | Aminoanthraquinone (c) | Nitrilotriacetic acid (a) | NiCl$_2$ | 70:18:12 | 12 |
| 12 | C.I. Acid Yellow 23 (a) | Imidazol (c) | Cu(NO$_3$)$_2$ | 80:10:10 | 8 |
| 13 | C.I. Fluorescent Brightening Agent 32 (a) | Pyridine (c) | CuSO$_4$ | 80:5:15 | 2 |
| 14 | Vitamin A (a) | Dithizone (c) | CuSO$_4$ | 80:10:10 | 18 |
| 15 | Flavonol (a) | Ethylenediamine (c) | Co(NO$_3$)$_2$ | 75:17:8 | 13 |
| 16 | Quinoxaline carboxylic acid (a) | Purine (c) | CuCl$_2$ | 75:25:5 | 13 |
| 17 | C.I. Basic Orange 14 (c) | Adenosine-5'-triphosphate (a) | MgCl$_2$ | 75:15:10 | 8 |
| 18 | C.I. Solubilized Vat Blue 26 (a) | Diphenylcarbazone (c) | Ni(NO$_3$)$_2$ | 75:15:10 | 0 |
| 19 | C.I. Acid Blue 40 (a) | Piperidine (c) | AgNO$_3$ | 75:10:15 | 0 |
| 20 | Quinizarin (a) | Histamine (c) | FeSO$_4$ | 75:15:10 | 7 |

EXAMPLE 3

Coating compositions were prepared each in an overall concentration of 0.1% by weight by dissolving the components (A), (B) and (C) indicated in Table 3 in a proportion shown in the table in a 90:10 by weight mixture of water and acetone. In some of the preparations, a silicic acid compound was further added to the coating composition as the component (D) as shown in Table 3.

The inner walls and other surfaces of a stainless steel-made polymerization reactor of 100 liter capacity equipped with a stirrer were coated with either one of the thus prepared coating compositions and dried by heating at 70° C. for 10 minutes followed by washing with water. Into the thus coated polymerization reactor were introduced 40 kg of deionized water, 2.2 kg of sodium laurylsulfate, 3.0 kg of cetyl alcohol, 20 g of α,α'-azobisdimethylvaleronitrile and 20 kg of vinyl chloride monomer and the polymerization reaction of the monomer was performed by agitating the polymerization mixture at 50° C. for 7 hours.

TABLE 2

| Exp. No. | A | B | C | A:B:C weight ratio | Solvent | Scale prevention, times |
|---|---|---|---|---|---|---|
| 21 | — | — | — | — | — | 0 |
| 22 | Dithiodinaphthol (a) | Triethylenetetramine (c) | Cu(NO$_3$)$_2$ | 80:10:10 | Acetone | 6 |
| 23 | Hydroxybenzofluorenone (a) | N,N'—tetramethyl ethylenediamine (c) | Ni(NO$_3$)$_2$ | 70:20:10 | Methyl alcohol | 8 |
| 24 | Benzophenanthrene carboxylic acid (a) | Terpyridine (c) | Ni(NO$_3$)$_2$ | 60:25:15 | Ethyl acetate | 8 |
| 25 | Anthrahydroquinone (a) | o-Phenanthroline (c) | Fe(NO$_3$)$_2$ | 50:40:10 | Ethyl acetate | 7 |
| 26 | C.I. Mordant Blue 56 (a) | Bipyridine (c) | Co(CH$_3$COO)$_2$ | 60:35:5 | Ethyl acetate | 20 |
| 27 | Erioanthracene Pure Blue FF (a) | Acetylacetone (c) | ThCl$_4$ | 70:25:5 | Acetone | 13 |
| 28 | C.I. Vat Blue 67 (a) | Piperidine (c) | AgNO$_3$ | 70:20:10 | Methylene | 21 |

TABLE 2-continued

| Exp. No. | A | B | C | A:B:C weight ratio | Solvent | Scale prevention, times |
|---|---|---|---|---|---|---|
| | | | | | chloride | |
| 29 | Dihydroxyacridone (a) | o-Phenylenediamine (c) | FeCl₂ | 60:28:12 | Butyl acetate | 17 |
| 30 | Hydroxyphenyl quinoline (a) | Diphenylcarbazide (c) | CuCl₂ | 50:36:14 | Isoamyl alcohol | 15 |
| 31 | C.I. Azoic Black 1 (a) | Benzoylmethane (c) | BeCl₂ | 75:9:16 | Dioxane | 15 |
| 32 | Indolotropolone (a) | Purine (c) | NiCl₂ | 75:15:10 | Dioxane | 14 |
| 33 | Lutein (a) | 4,7-Diphenyl-1,10-phenanthroline (c) | FeCl₂ | 60:30:10 | Dioxane | 15 |
| 34 | Fisetin (a) | 2,2'-Diquinolyl (c) | FeCl₂ | 55:30:15 | Methyl isobutyl ketone | 13 |
| 35 | Thiofluorescein (a) | Thenoyl trifluoroacetone (c) | BaCl₂ | 50:42:8 | Dioxane | 11 |
| 36 | Resazurin (a) | 3,3'-Diaminobenzidine (c) | NiCl₂ | 50:40:10 | Methyl alcohol | 18 |
| 37 | Naphtholindole indigo (c) | Adenosine-5'-triphosphate (a) | CuSO₄ | 60:25:15 | Methyl alcohol | 11 |
| 38 | Naphthopyrazolequinone (c) | N—Dihydroxyethyl glycine | ZnCl₂ | 60:30:10 | Cyclohexane | 10 |
| 39 | C.I. Vat Yellow 22 (c) | 8-Hydroxyquinoline (a) | CuCl₂ | 60:25:15 | Dioxane | 18 |
| 40 | C.I. Vat Brown 61 (c) | Ascorbic acid (a) | CuCl₂ | 60:30:10 | Tetrahydrofuran | 15 |

The polymerization run performed in the above described manner was repeated without cleaning the reactor walls after each run prior to the introduction of another polymerization mixture and the number of the polymerization runs which could be performed without polymer scale deposition on the walls in an amount exceeding 1 g/m² was recorded to give the results shown in Table 3.

EXAMPLE 4

Coating compositions were prepared each in an overall concentration of 0.1% by weight by dissolving the components (A), (B) and (C) indicated in Table 4 in a proportion shown in the same table in a 90:10 by weight mixture of water and ethyl acetate. In some of the preparations, a silicic acid compound was further added to the coating composition as the component (D) shown in Table 4.

The inner walls and other surfaces of a stainless steel-made polymerization reactor of 100 liter capacity equipped with a stirrer were coated with either one of the thus prepared coating compositions and dried by heating at 70° C. for 10 minutes followed by washing with water. Into the thus coated polymerization reactor were introduced 40 kg of deionized water, 5.8 kg of n-butyl acrylate, 13.6 kg of methyl methacrylate, 300 g of acrylic acid, 300 g of methacrylic acid, 100 g of sodium dodecylbenzene sulfonate, 700 g of polyoxyethylene nonyl phenyl ether and 20 g of ammonium persulfate and the polymerization mixture was heated up to 60° C. where 20 g of sodium hydrogensulfite were further added to the mixture. The polymerization reaction was performed by agitating the polymerization mixture at 60° C. for 6 hours. After completion of the polymerization run, the polymerizate slurry was discharged out of the polymerization reactor and the amount of the polymer scale deposited on the reactor walls was examined to give the results shown in Table 4.

TABLE 3

| Exp. No. | A | B | C | A:B:C weight ratio | D | A + B + C/D weight ratio | Scale prevention, times |
|---|---|---|---|---|---|---|---|
| 41 | — | — | — | — | — | — | 0 |
| 42 | — | Ethylenediamine tetraacetic acid (a) | — | — | — | — | 0 |
| 43 | — | Ethylenediamine tetraacetic acid (a) | Th(NO₃)₄ | 0:70:30 | — | — | 0 |
| 44 | C.I. Vat Red 13 (c) | Ethylenediamine tetraacetic acid (a) | — | 80:20:0 | — | — | 0 |
| 45 | C.I. Vat Red 13 (c) | Ethylenediamine tetraacetic acid (a) | ThCl₄ | 70:18:12 | — | — | 8 |
| 46 | Diaminobinaphthyl (c) | Iminodiacetic acid (a) | Co(CH₃COO)₂ | 65:37:8 | — | — | 6 |
| 47 | Naphthylanthracene (c) | Ethylenediamine dipropionicdiacetic acid (a) | ZnCl₂ | 70:20:10 | — | — | 5 |
| 48 | C.I. Vat Green 3 (c) | Thioglycolic acid (a) | NiCl₂ | 75:18:7 | Colloidal silica | 100/100 | 31 |
| 49 | C.I. Pigment Blue 15 (c) | Adenosine-5'-triphosphate (a) | CaCl₂ | 80:15:5 | — | — | 22 |
| 50 | C.I. Basic Blue 3 (c) | Glycine (a) | Zn(CH₃COO)₂ | 80:15:5 | Water glass | 100/50 | 30 |
| 51 | C.I. Basic Violet 1 (c) | α-Furyldioxime (a) | CuCl₂ | 75:17:8 | — | — | 21 |
| 52 | Hydroxy dimethylaminophenoxazine (a) | Diethylenetriamine (c) | Ni(NO₃)₂ | 75:15:10 | — | — | 28 |
| 53 | Dihydroxynaphthoquinone (a) | Bipyridine (c) | Cu(CH₃COO)₂ | 70:23:7 | Colloidal silica | 100/50 | 31 |

TABLE 3-continued

| Exp. No. | A | B | C | A:B:C weight ratio | D | A + B + C/D weight ratio | Scale prevention, times |
|---|---|---|---|---|---|---|---|
| 54 | C.I. Vat Blue 72 (a) | o-Phenanthroline (c) | AgNO$_3$ | 70:22:8 | — | — | 33 |
| 55 | C.I. Acid Violet 34 (a) | Thiourea (c) | NiCl$_2$ | 70:20:10 | — | — | 28 |
| 56 | C.I. Vat Blue 67 (a) | 1,2-Diaminopropane (c) | Ni(NO$_2$)$_2$ | 65:25:10 | — | — | 30 |
| 57 | Hydroxyphenoxazone (a) | Glyoxal bis(methylcumine) (c) | Cu(CH$_3$COO)$_2$ | 85:10:5 | — | — | 21 |
| 58 | C.I. Acid Yellow 12 (a) | 2,2'-Diquinolyl (c) | CuCl$_2$ | 80:14:6 | — | — | 20 |
| 59 | Aminophenoxazone carboxylic acid (a) | 3,3'-Diaminobenzidine (c) | Fe(NO$_3$)$_2$ | 80:12:8 | — | — | 22 |
| 60 | β-Carotene (c) | 8-Hydroxyquinoline (a) | UO$_2$Cl$_2$ | 80:10:10 | — | — | 23 |

EXAMPLE 5

Coating compositions were prepared each in an overall concentration of 0.2% by weight by dissolving the components (A), (B) and (C) indicated in Table 5 in a proportion shown in the same table in a 80:20 by weight mixture of water and acetone. In some of the preparations, a silicic acid compound was further added to the coating composition as the component (D) shown in Tanle 5.

The inner walls and other surfaces of a stainless steel-made polymerization reactor of 100 liter capacity equipped with a stirrer were coated with either one of the thus prepared coating compositions and dried by heating at 50° C. for 30 minutes followed by washing with water. Into the thus coated polymerization reactor were introduced 40 kg of deionized water, 20 kg of styrene monomer, 200 g of calcium phosphate, 20 g of soldium dodecylbenzene sulfonate and 20 g of benzoyl peroxide and the polymerization reaction was performed by agitating the polymerization mixture at 90° C. for 11 hours.

After completion of the polymerization run, the polymerizate slurry was discharged out of the polymerization reactor and another polymerization run was repeated in just the same manner as above without cleaning the reactor walls after each run prior to introduction of another polymerization mixture. By repeating the polymerization runs in this manner, the number of the runs which could be performed without polymer scale deposition in an amount exceeding 1 g/m$^2$ was recorded to give the results shown in Table 5.

TABLE 4

| Exp. No. | A | B | C | A:B:C weight ratio | D | A + B + C/D weight ratio | Scale deposition, g/m$^2$ |
|---|---|---|---|---|---|---|---|
| 61 | — | — | — | — | — | — | 1300 |
| 62 | Pyruvilazoresorcine (a) | Isonicotinic acid hydrazide (c) | Cu(NO$_3$)$_2$ | 80:10:10 | — | — | 8 |
| 63 | Diphenylpyridoquinoline dicarboxylic acid (a) | Diphenyl carbazide (c) | Cu(NO$_3$)$_2$ | 70:15:15 | — | — | 9 |
| 64 | Folic acid (a) | Bipyridine (c) | Co(CH$_3$COO)$_2$ | 70:18:12 | — | — | 0 |
| 65 | Lutein (a) | o-Phenanthroline (c) | FeSO$_4$ | 75:15:10 | — | — | 1 |
| 66 | Gallein (a) | Pyridine (c) | CuCl$_2$ | 75:13:12 | — | — | 0 |
| 67 | C.I. Solvent Black 7 (a) | Ethylenediamine (c) | NiCl$_2$ | 75:15:10 | Colloidal silica | 100/10 | 0 |
| 68 | C.I. Direct Green 28 (a) | Triethylenetetramine (c) | NiCl$_2$ | 75:15:10 | Colloidal silica | 100/100 | 0 |
| 69 | C.I. Acid Black 48 (a) | 1,2-Diaminopropane (c) | NiCl$_2$ | 80:5:15 | Colloidal silica | 100/200 | 0 |
| 70 | C.I. Solubilized Vat Blur 6 (a) | Acetylacetone (c) | Al$_2$(SO$_3$)$_3$ | 80:5:15 | — | — | 10 |
| 71 | Dihydroxynaphthoquinone (a) | Histamin (c) | Ni(NO$_3$)$_2$ | 80:15:5 | — | — | 7 |
| 72 | Hydroxybenzoacridine (a) | Imidazole (c) | ZnCl$_2$ | 80:15:5 | — | — | 5 |
| 73 | C.I. Solvent Black 5 (c) | Iminodiacetic acid (a) | CoCl$_2$ | 85:10:5 | — | — | 18 |
| 74 | C.I. Basic Violet 1 (c) | Ethylenediamine tetraacetic acid (a) | Th(SO$_4$)$_2$ | 85:7:8 | Water glass | 100/100 | 0 |
| 75 | C.I. Basic Red 1 (c) | 2-Aminoethylphosphonic-N,N'—diacetic acid (a) | Th(SO$_4$)$_2$ | 80:15:5 | Water glass | 100/100 | 0 |
| 76 | Benzoflavin (c) | Citric acid (a) | CaCl$_2$ | 80:15:5 | — | — | 17 |
| 77 | Phenyl azotriphenyl pyrazole (c) | Dimethylglyoxime (a) | Ni(NO$_3$)$_2$ | 70:20:10 | — | — | 55 |
| 78 | C.I. Basic Orange 14 (c) | -Benzoinoxime (a) | Ni(NO$_3$)$_2$ | 70:20:10 | — | — | 11 |
| 79 | α-Carotene (c) | Adenosine-5'-triphosphate (a) | Ni(NO$_3$)$_2$ | 70:20:10 | — | — | 10 |
| 80 | Diazine (c) | α-Furyl dioxime (a) | Ni(NO$_3$)$_2$ | 70:20:10 | — | — | 14 |

TABLE 5

| Exp. No. | A | B | C | A:B:C weight ratio | D | A + B + C/D weight ratio | Scale prevention, times |
|---|---|---|---|---|---|---|---|
| 81 | — | — | — | — | — | — | 0 |
| 82 | -Carotene (c) | N—di(hydroxyethyl) glycine (a) | $CuCl_2$ | 80:10:10 | — | — | 15 |
| 83 | Lycopene (c) | Nitrilotriacetic acid (a) | $ZnCl_2$ | 75:15:10 | — | — | 11 |
| 84 | Phenoazoxide (c) | N,N—Ethylenediamine diacetic acid (a) | $Cu(NO_3)_2$ | 80:10:10 | — | — | 19 |
| 85 | Triphenylpyrazoline (c) | 1,2-Cyclohexanediamine tetraacetic acid (a) | $GaCl_3$ | 80:10:10 | — | — | 12 |
| 86 | C.I. Basic Orange 16 (c) | 2-Aminoethylphosphonic-N,N'—diacetic acid (a) | $GaCl_3$ | 80:15:5 | Colloidal silica | 100/100 | 33 |
| 87 | C.I. Disperse Blue 56 (c) | 8-Hydroxyquinoline (a) | $Ce(NO_3)_3$ | 85:10:5 | Lithium orthosilicate | 100/40 | 35 |
| 88 | Phenanthrophenazine (c) | Glycine (a) | $Co(CH_3COO)_2$ | 75:15:10 | — | — | 10 |
| 89 | Vitamin $B_2$ (c) | Triethanolamine (a) | $Ni(NO_3)_2$ | 70:20:10 | — | — | 10 |
| 90 | Diaminophenazine (c) | 1,2-Dimercaptopropyl alcohol (a) | $Ni(NO_3)_2$ | 50:40:10 | — | — | 18 |
| 91 | Naphthylidine (c) | Quinaldinic acid (a) | $Ni(NO_3)_2$ | 50:40:10 | — | — | 16 |
| 92 | Acriflavin (c) | Thiooxine (a) | $CuCl_2$ | 60:30:10 | — | — | 13 |
| 93 | Pyrroloquinoline (c) | 2-Mercaptobenzothiazole (a) | $CuCl_2$ | 70:20:10 | — | — | 11 |
| 94 | C.I. Basic Red 37 (c) | Adenosine-5'-triphosphate (a) | $MgCl_2$ | 80:12:8 | Colloidal silica | 100/200 | 39 |
| 95 | Tetrahydroxynaphthalene (a) | Ethylenediamine (c) | $CoCl_3$ | 70:15:5 | — | — | 21 |
| 96 | Hydroxy dimethylaminonaphthophenoxazine (a) | Triaminoethylamine (c) | $CuSO_4$ | 70:20:10 | — | — | 20 |
| 97 | Benzophenanthrene carboxylic acid (a) | N,N'—Dimethyl ethylenediamine (c) | $CuCl_2$ | 70:20:10 | — | — | 19 |
| 98 | Quinizarin (a) | 1,3-Diaminopropane (c) | $Ni(NO_3)_2$ | 70:25:5 | — | — | 20 |
| 99 | C.I. Vat Blue 64 (a) | Terpyridine (c) | $Ni(NO_3)_2$ | 70:25:5 | Sodium metasilicate | 100/70 | 41 |
| 100 | C.I. Mordant Blue 56 (a) | Purine (c) | $Cu(CH_3COO)_2$ | 70:25:5 | Water glass | 100/30 | 38 |

What is claimed is:

1. A method for preventing deposition of polymer scale on the walls of a polymerization reactor in the course of a polymerization reaction of an ethylenically unsaturated monomer or a mixture of ethylenically unsaturated monomers which comprises the steps of:
   (a) coating the reactor walls with a coating composition comprising:
      (A) an organic compound having at least 5 conjugated π bonds in a molecule,
      (B) a chelating agent, and
      (C) a metal compound capable of producing metal ions having a coordination number of at least 2, as dissolved or dispersed in a solvent; and
   (b) drying the thus coated reactor walls, prior to introduction of the polymerization mixture into the polymerization reactor.

2. The method as claimed in claim 1 wherein the organic compound as the component (A) in the coating composition is anionic and the chelating agent as the component (B) is cationic.

3. The method as claimed in claim 1 wherein the organic compound as the component (A) in the coating composition is cationic and the chelating agent as the component (B) is anionic.

4. The method as claimed in claim 1 wherein the amount of the component (B) in the coating composition is in the range from 0.01 to 10 parts by weight per 1 part by weight of the component (A).

5. The method as claimed in claim 1 wherein the amount of the component (C) in the coating composition is sufficient to convert substantially all of the component (B) to a metallic chelate compound.

6. The method as claimed in claim 1 wherein the coating composition further comprises a silicic acid compound.

7. The method as claimed in claim 6 wherein the amount of the silicic acid compound is in the range from 0.01 to 10 parts by weight per 1 part by weight of the component (A).

* * * * *

UNITED STATES PATENT AND TRADEMARK OFFICE
CERTIFICATE OF CORRECTION

PATENT NO. : 4,539,230
DATED : September 3, 1985
INVENTOR(S) : Toshihide Shimizu, Ichiro Kaneko, Yoshiteru Shimakura It is certified that error appears in the above—identified patent and that said Letters Patent is hereby corrected as shown below:

Col. 4, lines 57/58, change "C. I. Solvent Black 7" to --C. I. Acid Black 2--;

Col. 9, Table 1, Exp. No. 2, change "C. I. Solvent Black 7" to --C. I. Acid Black 2--;
Exp. No. 5, change "C. I. Solvent Black 7" to --C. I. Acid Black 2--;
Exp. No. 6, change "C. I. Solvent Black 7" to --C. I. Acid Black 2--;
Exp. No. 7, change "C. I. Solvent Black 7" to --C. I. Acid Black 2--.

Signed and Sealed this

Thirteenth Day of September, 1988

*Attest:*

DONALD J. QUIGG

*Attesting Officer*  *Commissioner of Patents and Trademarks*